Sept. 24, 1940.  J. W. LEIGHTON  2,215,967
UNIVERSAL CONNECTION
Filed Nov. 1, 1937
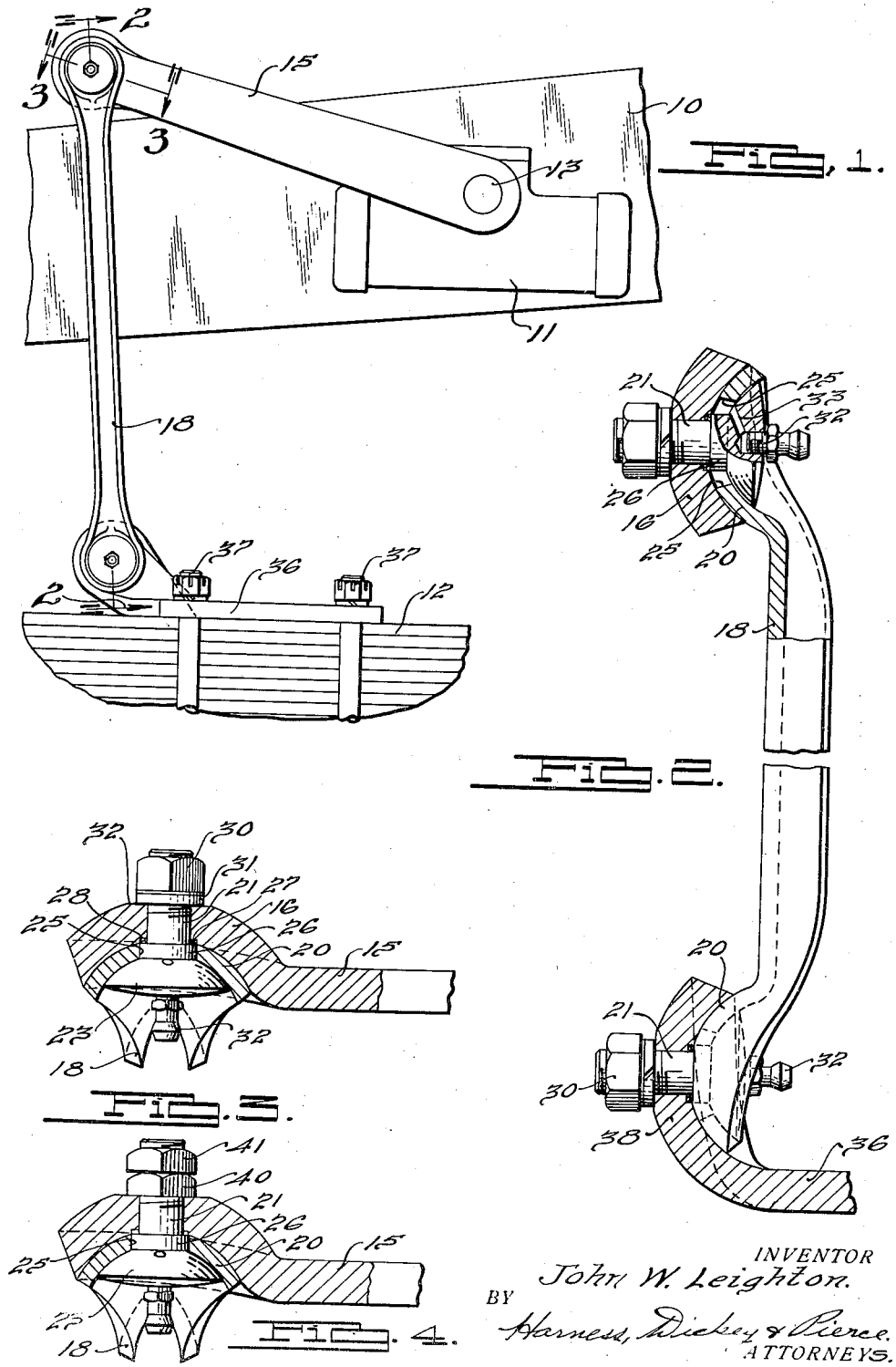
INVENTOR
John W. Leighton.
BY Harness, Dickey & Pierce.
ATTORNEYS.

Patented Sept. 24, 1940

2,215,967

UNITED STATES PATENT OFFICE 2,215,967

UNIVERSAL CONNECTION

John W. Leighton, Port Huron, Mich.

Application November 1, 1937, Serial No. 172,069

3 Claims. (Cl. 287—90)

The invention relates generally to pivotal connections and it has particular relation to a pivotal connection of universal joint character for connecting a shock absorber arm to a part of a vehicle.

One object of the invention is to provide an improved and inexpensive linkage for connecting the arm of a shock absorber to a part of the vehicle such as the spring.

Another object of the invention is to provide an improved pivotal connection of universal character for connecting linkage, which will allow free turning movement in one plane and limited turning movement in other planes.

Another object of the invention is to provide an efficient means for lubricating a pivotal connection such as set forth previously.

Another object of the invention is to provide simple and efficient means for adjusting a connection of the above designated character so as to compensate for variations such as that caused by wear and enable obtaining a smooth fitting connection at all times.

Other objects of the invention will become apparent from the following specification, the drawing to which it relates, and from the claims hereinafter set forth.

For a better understanding of the invention, reference may be had to the drawing wherein:

Figure 1 is a side elevational view illustrating the manner of connecting the shock absorber to the vehicle spring according to one form of the invention;

Fig. 2 is a cross-sectional view on a larger scale taken substantially along the line 2—2 of Fig. 1;

Fig. 3 is a cross-sectional view on a larger scale taken substantially along the line 3—3 of Fig. 1;

Fig. 4 is a view similar to Fig. 3 illustrating another form of the invention.

Referring to Fig. 1, the chassis frame of the motor vehicle is indicated at 10, a shock absorber secured to the frame is indicated at 11, and one of the conventional leaf springs is indicated at 12. The shock absorber includes a transversely extending shaft 13 and conventionally a linkage connects the shaft to the leaf spring so that during relative vertical movement of the chassis frame and the spring, the shaft is oscillated and this results in actuation of the shock absorber for the purpose intended. The invention according to the particular form illustrated involves the linkage and pivotal connection between the shock absorber and the spring so as to obtain efficiency and freedom in operation.

The arm connected to the shaft 13 is indicated at 15 and this arm, as best shown by Figs. 2 and 3, terminates at its outer end in a frusto-spherical shell section 16. This end of the arm 15 is connected to a link 18 that generally throughout its length is of channel or U-shape and which at each of its ends is provided with a frusto-spherical shell section 20. It will be evident that the linkage 18 may be formed from a strip of sheet steel that is stamped or pressed between die members to form the U-shaped body section and the frusto-spherical shell sections at the ends.

The outer spherical surface of the section 20 is complementary to and nicely fits the inner spherical surface of the end 16 of arm 15 and such spherical shell sections are connected together by means of a bolt 21. This bolt has a head 23 that is frusto-spherical in character so as to nicely fit the inner spherical surface of the shell section 20 and the frusto-spherical sections 16 and 20 are provided with openings 24 and 25, respectively, for the bolt. It will be noted that the opening 25 in shell section 20 is larger than the opening in portion 16 and that the bolt adjacent the head 23 is enlarged to provide a collar 26 disposed in the opening 25. It is also to be noted that the shell section 16 at its inner side has a counter-sunk recess 27 of substantially the same diameter as the collar 26 on the bolt so that if necessary the collar may project into the recess. On or more shims 28 are disposed in the counter-sunk recess 27 and it will be apparent from this that if sufficient shims are placed in the recess, the bolt may be tightened so as to draw the collar 26 up against the shims without causing a binding pressure between the shell sections 16 and 20 and bead 23. By nice adjustment of the shims, the spherical surfaces may be maintained in close but non-binding contact so as to allow a free pivotal movement without looseness. The bolt is provided with a conventional nut 30 and a lock washer 31 and it will be noted that the section 16 is flattened on its outer side, as indicated at 32, so as to provide a flat surface for engagement with the lock washer.

Now, directing attention particularly to Fig. 2, it will be noted that the opening 25 is much longer in a vertical direction than the diameter of the collar 26 although the transverse width of the opening 25 is of substantially the same diameter as the collar 26 so that the collar may work smoothly throughout the length of the opening. It will now be apparent that the link 18 can be freely and completely turned about the axis of the bolt 21 and also that it may be tilted longitudinally of such axis to the extent permitted by the length of the opening 25. More particularly, it will be noted that at any point during movement of the link 18 completely about the axis of the bolt 21, the link may be moved longitudinally of the axis. It will be appreciated that during normal vertical movement of the frame and spring relatively, only relative turning of the link 18 and arm 15 about the bolt axis will occur, but if the frame and leaf spring tilt or more laterally with respect to each other in any manner, pivotal movement of the arm and link relatively along the axis of the bolt is permitted to compensate for the different movements.

Lubricant is injected between the spherical surfaces by means of a grease fitting 32 on the head 23 of the bolt and a passageway 33 extending to the opening 25.

The lower end of the link 18 is connected to a bracket member 36 that is secured to the spring 12 by the conventional bolts 37 connecting the spring to the axle. This bracket, as best shown in Fig. 2, has one end formed with a frusto-spherical shell section 38 and the connection between the lower end of the link 18 and the shell section 38 is the same as that previously described in connection with the upper end of the link.

Figure 4 is substantially the same as Fig. 3, excepting that in place of shims 28 and the recess 27, the outer end of the bolt is provided with nuts 40 and 41 that lock together, as will be well understood. In this arrangement, the nut 40 is turned until the spherical surfaces have the desired operating fit and then the nut 41 is turned until it engages the nut 40 sufficiently to lock the latter in position. This arrangement permits of adjustment without disassembling the joint.

From the foregoing it will be appreciated that a universal connection is provided at each end of the link 18 which will smoothly and without noise permit relative pivotal movement between the ends of the link and the arm and spring during relative movement of the frame and spring vertically. It will also be apparent that if the spring and frame have any other movements such as lateral sidewise or tilting movement, the pivotal connections at the ends of the link will readily accommodate this movement in a free and easy manner and without in any way binding. Moreover it will be appreciated that the link 18 and the connections between the link, bracket, and shock absorber arm may be easily fabricated from sheet metal or forgings. Assembly of the parts is easily effected and very little difficulty is involved in placing the proper number of shims around the bolts or adjusting the lock nuts so as to obtain the proper degree of tightness. The assembly is very inexpensive to manufacture and assemble and is very durable in use.

Although more than one form of the invention has been described and illustrated in detail, it will be apparent to those skilled in the art that various modifications may be made without departing from the scope of the claims.

What is claimed is:

1. In combination, a member having a frusto-spherical surface and an opening extending therethrough, a bolt passing through said opening and having a head shaped to provide a frusto-spherical surface next to but spaced from and concentric to said first surface, a second member having frusto-spherical inner and outer surfaces between and in engagement with the first two surfaces and having an opening through which the bolt extends and which is substantially larger than the first opening, a shoulder on the bolt and located in said second opening and which is adapted by engagement with the first member to hold the head in predetermined spaced relation to said first member, and means for holding the bolt in position on said first member and said shoulder against the latter.

2. In combination, a member having a frusto-spherical surface and an opening extending therethrough, a bolt passing through said opening and having a head shaped to provide a frusto-spherical surface next to but spaced from and concentric to said first surface, a second member having frusto-spherical inner and outer surfaces between and in engagement with the first two surfaces and having an opening through which the bolt extends and which is substantially larger than the first opening, a shoulder on the bolt and located in said second opening and which is adapted by engagement with the first member to hold the head in predetermined spaced relation to said first member, and means for holding the bolt in position on said first member and said shoulder against the latter, said opening in the second member being of elongated shape with the width of the opening substantially corresponding to the diameter of the shoulder.

3. In combination, a member having a frusto-spherical surface and an opening extending therethrough, a bolt passing through said opening and having a head shaped to provide a frusto-spherical surface next to but spaced from and concentric to said first surface, a second member having frusto-spherical inner and outer surfaces between and in engagement with the first two surfaces and having an enlarged opening through which the bolt extends, an annular shoulder on the bolt and which is located in said enlarged opening, the opening in the first member being enlarged adjacent its frusto-spherical surface so as to allow the shoulder to move into the larger portion, and means in said enlarged portion of the opening in the first member for variably changing its depth so as to vary the abutment with which the shoulder engages when the bolt is fastened to such member.

JOHN W. LEIGHTON.